United States Patent
Park et al.

(10) Patent No.: US 10,185,048 B2
(45) Date of Patent: Jan. 22, 2019

(54) 3-DIMENSIONAL AIRBORNE MAGNETIC SURVEY SYSTEM AND 3-DIMENSIONAL AIRBORNE MAGNETIC SURVEY METHOD USING THE SAME

(71) Applicant: Korea Institute of Geoscience and Mineral Resources, Daejeon (KR)

(72) Inventors: Gye Soon Park, Daejeon (KR); Seong Jun Cho, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 24 days.

(21) Appl. No.: 14/410,632

(22) PCT Filed: Dec. 8, 2014

(86) PCT No.: PCT/KR2014/011985
§ 371 (c)(1),
(2) Date: Aug. 8, 2016

(87) PCT Pub. No.: WO2015/088205
PCT Pub. Date: Jun. 18, 2015

(65) Prior Publication Data
US 2016/0341845 A1   Nov. 24, 2016

(30) Foreign Application Priority Data
Dec. 9, 2013 (KR) .................. 10-2013-0152145

(51) Int. Cl.
*G01V 3/16* (2006.01)
*G01V 3/165* (2006.01)
*G01V 3/38* (2006.01)

(52) U.S. Cl.
CPC ............. *G01V 3/16* (2013.01); *G01V 3/165* (2013.01); *G01V 3/38* (2013.01)

(58) Field of Classification Search
CPC . G01V 3/16; G01V 3/38; G01V 3/165; G01V 11/00
See application file for complete search history.

(56) References Cited

U.S. PATENT DOCUMENTS 3,123,766 A * 3/1964 Ruddock et al. ...... G01V 3/165
244/118.1
3,536,992 A * 10/1970 Dietrich ............... G01R 33/022
250/330
(Continued)

FOREIGN PATENT DOCUMENTS

EP         0052052 A1    5/1982
JP      2007-232621 A    9/2007
(Continued)

OTHER PUBLICATIONS

PCT International Search Report for related PCT application No. PCT/KR2014/011985 dated Feb. 23, 2015.

*Primary Examiner* — Julian D Huffman
*Assistant Examiner* — Michael T Konczal
(74) *Attorney, Agent, or Firm* — Dentons US LLP

(57) ABSTRACT

The present invention relates to a 3-dimensional airborne magnetic survey system that includes an unmanned aerial vehicle for magnetic survey moving along coordinate areas desired to survey while varying altitudes for each of the coordinate areas, a magnetic survey unit mounted on the unmanned aerial vehicle for magnetic survey and surveying 3D magnetic data of the earth or strata according to the altitudes, a 3-dimensional magnetic data processing unit processing a inversion on the 3-dimensional magnetic data of the earth or the strata according to the altitude for each coordinate area, a VSAT interface, a wireless controller interacting with the VSAT interface, a flight control signal
(Continued)

for controlling the unmanned aerial vehicle of magnetic survey, and a magnetic survey signal through an internal navigation program.

8 Claims, 19 Drawing Sheets

(56) References Cited

U.S. PATENT DOCUMENTS

| | | | |
|---|---|---|---|
| 5,898,680 A * | 4/1999 | Johnstone | H04B 7/18523 340/995.1 |
| 6,765,383 B1 | 7/2004 | Barringer | |
| 7,397,417 B2 | 7/2008 | Jackson | |
| 8,386,180 B2 | 2/2013 | Davies | |
| 2008/0125920 A1 | 5/2008 | Miles et al. | |
| 2013/0018588 A1* | 1/2013 | Zhdanov | G01V 3/08 702/11 |
| 2013/0321621 A1* | 12/2013 | Menzel | G01V 3/08 348/142 |

FOREIGN PATENT DOCUMENTS

| | | |
|---|---|---|
| KR | 10-0974484 B1 | 8/2010 |
| KR | 10-1313195 B1 | 1/2013 |

* cited by examiner

3-DIMENSIONAL AIRBORNE MAGNETIC SURVEY SYSTEM AND 3-DIMENSIONAL AIRBORNE MAGNETIC SURVEY METHOD USING THE SAME

CROSS-REFERENCE TO RELATED APPLICATION

This application is the Section 371 National Stage of PCT/KR2014/011985 filed Dec. 9, 2014, the entirety of which is incorporated herein by reference to the extent permitted by law. This application claims the benefit of priority to Korean Patent Application No. KR 10-2013-0152145, filed Dec. 9, 2013 the entirety of which is incorporated herein by reference to the extent permitted by law.

BACKGROUND OF THE INVENTION

1. Field of the Invention

The present disclosure relates to a magnetic survey system using an unmanned aerial vehicle, and more particularly, to a 3-dimensional airborne magnetic survey system and a 3-dimensional airborne magnetic survey method using the same.

2. Description of the Related Art

Typically, an airborne magnetic survey using a helicopter or a fixed-wing aircraft has merits in that a wide survey area may be surveyed in a rapid time.

However, since flight is required to be made high in a certain height or higher from a target object (the surface of the earth) in order to secure stability, it has many limitations to obtain data of high resolution. Accordingly, the airborne magnetic survey is mainly used for early wide area survey among many survey stages.

As a survey method with high stability such as an unmanned aerial vehicle has been recently developed, a method is now being developed which is capable of obtaining high resolution data by lowering the survey altitude near the earth in order to overcome the weakness of the airborne magnetic survey.

In such a way, a compact survey is performed within a narrow area with the low altitude airborne magnetic survey recently being developed in comparison to the existing method. This leads to researches trying to derive an interpretation result for a subsurface structure, which has higher resolution compared to the survey result obtained by using the existing fixed-wing aircraft.

Accordingly, it may be said to be an important research project to try to interpret structural magnetic susceptibility model having higher resolution by using magnetic survey data for interpreting a subsurface magnetic susceptibility structure.

Typically, the purpose of airborne magnetic survey is to construct a distribution map of magnetic anomaly over a wide survey area.

In other words, major concern is to construct a magnetic anomaly map. Accordingly, survey points for the airborne magnetic survey data have two-dimensional distribution. On the contrary, the newly proposed method is a method of acquiring magnetic survey data three-dimensionally rather than as 2 two-dimensional planar data.

In other words, for the typical survey methods, one magnetic value is obtained at an identical x, y (or latitude & longitude) coordinate, while the newly proposed method may acquire various survey data whose altitudes are different even at the identical x, y (or latitude & longitude) coordinate.

Such a 3-dimensional survey method can reduce the errors in calculation, which may occur when numerically calculating 3-dimensional data using 2-dimensional data or errors that may occur from anomaly bodies of residual magnetization, and include all merits that the 3-dimensional data has. As for the merits of the 3-dimensional data, data having various distances from magnetic anomaly bodies distributed underground are included in the same inversion processing and data used for the inversion processing have various resolutions, and therefore distribution efficiency of input data for the inversion processing becomes improved. Due to this, it is effective to reduce non-uniqueness of magnetic inversion interpretation performed to interpret a subsurface magnetic susceptibility structure, and it is effective to predict magnetization direction of anomaly bodies of residual magnetization, which is different from that of the geomagnetic field and is difficult to predict with the 2-dimensional data.

For example, in a case where it is assumed that anomaly bodies having various sizes and shapes illustrated in FIG. 1 are located at different areas in different depths, magnetic anomaly patterns appearing on the earth have similar sizes or patterns to each other like magnetic anomaly curves in the drawing and may not be distinguishable.

In other words, since sizes and shapes of a small anomaly body near the earth and a large deep anomaly body are identical, a number of errors (non-uniqueness of the inversion processing) may occur in determining one among various anomaly bodies in the inversion processing.

In detail, a magnetic survey data typically has a characteristic of having higher resolution, as a distance from a survey point to a target body is shorter.

This is because when two poles having magnetic pole strengths of $m_1$ and $m_2$ are distant from each other, a magnetic force F between the two poles is $$F = \frac{1}{\mu} \frac{m_1 m_2}{r^2},$$

where $\mu$ is permeability, according to Coulomb's law, and a magnetic field H used for magnetic survey is defined as a magnetic force applied to a unit pole and is a magnetic field $$H = \frac{F}{m_2} = \frac{1}{\mu} \frac{m_1}{r^2}$$

at a point distant away from $m_1$.

In other words, a magnetic field value actually surveyed in the magnetic survey is reversely proportional to square of distance away from a target body and becomes significantly reduced as farther away from the target body.

Considering such a principle, variation of an anomaly value according to the size of the anomaly body and a reduction effect according to a distance are merged to allow the non-uniqueness of the inversion processing to appear.

SUMMARY OF THE INVENTION

Embodiments of the present invention are directed to providing an effective 3-dimensional airborne magnetic survey system and a magnetic survey method using the same capable of improving distribution efficiency of data used for inversion processing to effectively reduce non-uniqueness of an inversion processing and of being effective in predicting magnetization direction of an anomaly body of residual magnetization.

Other embodiments of the present invention are directed to providing an effective 3-dimensional airborne magnetic survey system and a magnetic survey method using the same capable of improving distribution efficiency of data to substantially address issues that in a case where it is assumed that anomaly bodies having various sizes and shapes are located at different areas in different depths, sizes and patterns of surveyed magnetic anomaly curves are similar and not distinguished from each other, for example, an issue that since sizes and shapes of a small anomaly body near the earth and a large deep anomaly body are identical, a number of errors (non-uniqueness of the inversion processing) occur, and capable of being effective in interpreting magnetization directivity of an anomaly body of residual magnetization, which is difficult to predict using 2-dimensional survey data.

According to an aspect of the present invention, there is provided a 3-dimensional airborne magnetic survey system includes: an unmanned aerial vehicle for magnetic survey (110) moving along coordinate areas of the earth or strata desired to survey while varying altitudes for each of the coordinate areas; a magnetic survey unit (120) mounted on the unmanned aerial vehicle for magnetic survey (110) and surveying 3D magnetic data of the earth or strata, which is different from each other according to the altitudes; a 3-dimensional magnetic data processing unit (130) processing a inversion on the 3-dimensional magnetic data of the earth or the strata according to the altitude by using 3-dimensional coordinates; a VSAT interface (300); a wireless controller (140) interacting with the VSAT interface (300), receiving the 3-dimensional magnetic data, and outputting, to the unmanned aerial vehicle of magnetic survey (110), a flight control signal for controlling the unmanned aerial vehicle of magnetic survey (110) to be moveable at each altitude, an survey point coordinate signal, and a magnetic survey signal through an internal navigation program, wherein the wireless controller (140) comprises an image information display unit (141) displaying to a user the 3-dimensional magnetic data for each coordinate of the surveying target earth or the surveying target strata.

The unmanned aerial vehicle of magnetic survey (110) may include a GPS module (111) searching the coordinate areas of the earth or strata; and an altitude setting unit (112) varying the altitude for each of the coordinate areas according to an altitude control signal output from the wireless controller (140).

The 3-dimensional magnetic data processing unit (130) may include a 3-dimensional grid module (122) performing 3-dimensional gridding on the 3-dimensional magnetic data along a survey direction in a uniform interval; and a 3-dimensional inversion processing unit (132) processing an inversion on the 3-dimensional magnetic data gridded 3-dimensionally to interpret.

The image information display unit (141) may include a touch screen (141a) sensing touches of the user in a plurality of sensing schemes; and a control unit (141b) selecting one of touch signals sensed and created respectively with the plurality of sensing schemes on the basis of a type of an application being executed or a display state of the application, wherein the plurality of sensing schemes comprises at least two selected from resistive, capacitive, surface acoustic wave, infrared, optical imaging, and strain gauge schemes.

According to another aspect of the present invention, there is provided a 3-dimensional airborne magnetic survey method using the 3-dimensional airborne magnetic survey system includes: a magnetic survey preparing step (S110) for setting, by the wireless controller, the coordinate areas of the earth or strata desired to survey, survey points of the coordinate areas, and an altitude of the unmanned aerial vehicle for magnetic survey moving in the air over the coordinate areas; a magnetic surveying step (S120) for surveying a magnetic field of the earth or strata for each flight altitude; and a 3-dimensional magnetic data processing step (S130) for performing 3-dimensional gridding on the 3-dimensional magnetic data of the earth or strata surveyed according to an altitude variation along a survey direction in a uniform interval, and processing the inversion 3-dimensionally.

The 3-dimensional magnetic data processing step (S130) may include a 3-dimensional gridding step (S131) for performing 3-dimensional gridding on the 3-dimensional magnetic data along the survey direction in the uniform interval; and a 3-dimensional inversion processing step (S132) processing 3-dimensional inversion on the 3-dimensional magnetic data gridded 3-dimensionally.

The 3-dimensional airborne magnetic survey method may further include an image information displaying step (S140) for displaying to the user the 3D magnetic data for each of the coordinate areas of the surveying target earth or the surveying target strata through the image information display unit (141).

According to another aspect of the present invention, there is provided a non-transitory computer readable medium having a code recorded thereon, which, when executed by a computer, performs: a magnetic survey preparing step (S110) for setting, by the wireless controller, the coordinate areas of the earth or strata desired to survey, survey points of the coordinate areas, and an altitude of the unmanned aerial vehicle for magnetic survey moving in the air over the coordinate areas; a magnetic surveying step (S120) for surveying a magnetic field of the earth or strata for each flight altitude; and a 3-dimensional magnetic data processing step (S130) for performing 3-dimensional gridding on the 3-dimensional magnetic data of the earth or strata surveyed according to an altitude variation along a survey direction in a uniform interval, and processing the inversion 3-dimensionally.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE OF THE PRESENTLY PREFERRED EMBODIMENTS

Figure 1:
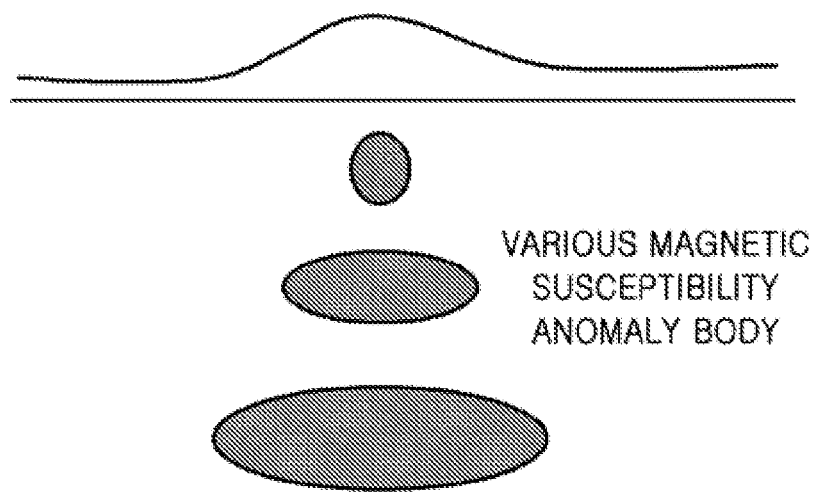
FIG. 1 is an exemplary view for explaining various anomaly bodies of magnetic susceptibility representing the same magnetic anomaly according to an embodiment of the invention.

Features and advantages of the present invention will be more clearly understood by the following detailed description of the present preferred embodiments by reference to the accompanying drawings. In the following description, detailed descriptions of well-known functions or constructions will be omitted since they would obscure the invention in unnecessary detail.

The present disclosure may be variously modified and realized in various forms, and thus specific embodiments will be exemplified in the drawings and described in detail herein below. However, the present invention is not limited to the specific disclosed forms, and needs to be construed to include all modifications, equivalents, or replacements included in the spirit and technical range of the present invention.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion, e.g., "between" versus "directly between", "adjacent" versus "directly adjacent", etc.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, components or combinations thereof, but do not preclude the presence or addition of one or more other features, integers, steps, operations, elements, components, or combinations thereof.

Hereinafter, a 3-dimensional (3D) airborne magnetic survey system and a magnetic survey method using the same according to embodiments of the present disclosure will be described in detail with reference to the accompanying drawings.

FIG. 1 is an exemplary view for explaining various anomaly bodies of magnetic susceptibility representing the same magnetic anomaly.

Figure 2:
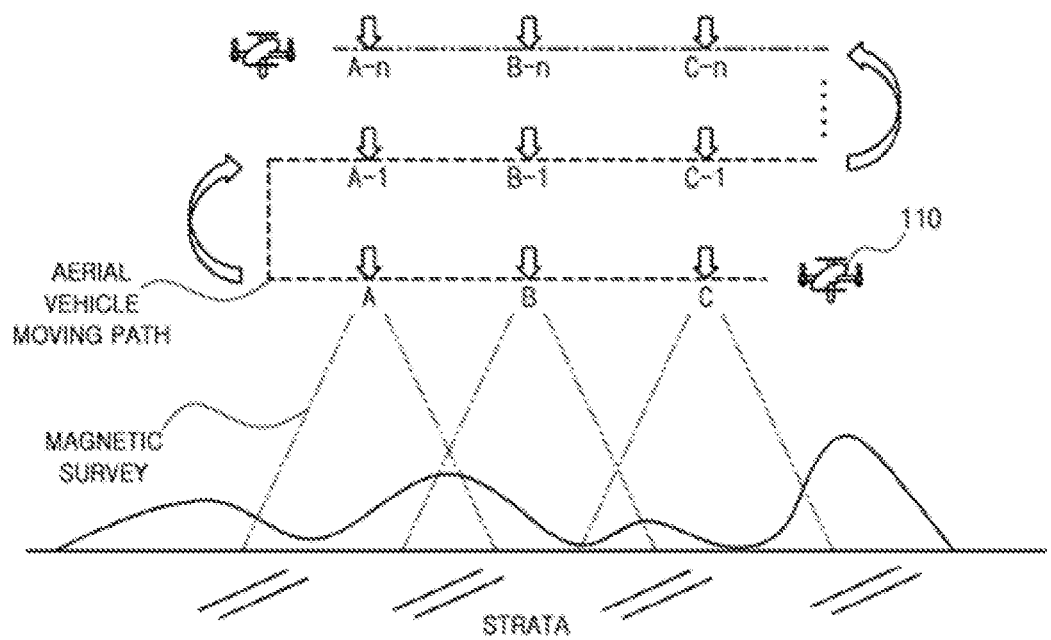
FIG. 2 is an exemplary view illustrating a process that an unmanned aerial vehicle for magnetic survey surveys a magnetic field of a target body (the earth or strata) from the same magnetic survey points for each altitude according to an embodiment of the invention.

FIG. 2 is an exemplary view illustrating a process that an unmanned aerial vehicle for magnetic survey surveys a magnetic field of a target (the earth or strata) from the same magnetic survey points for each altitude.

Figure 3:
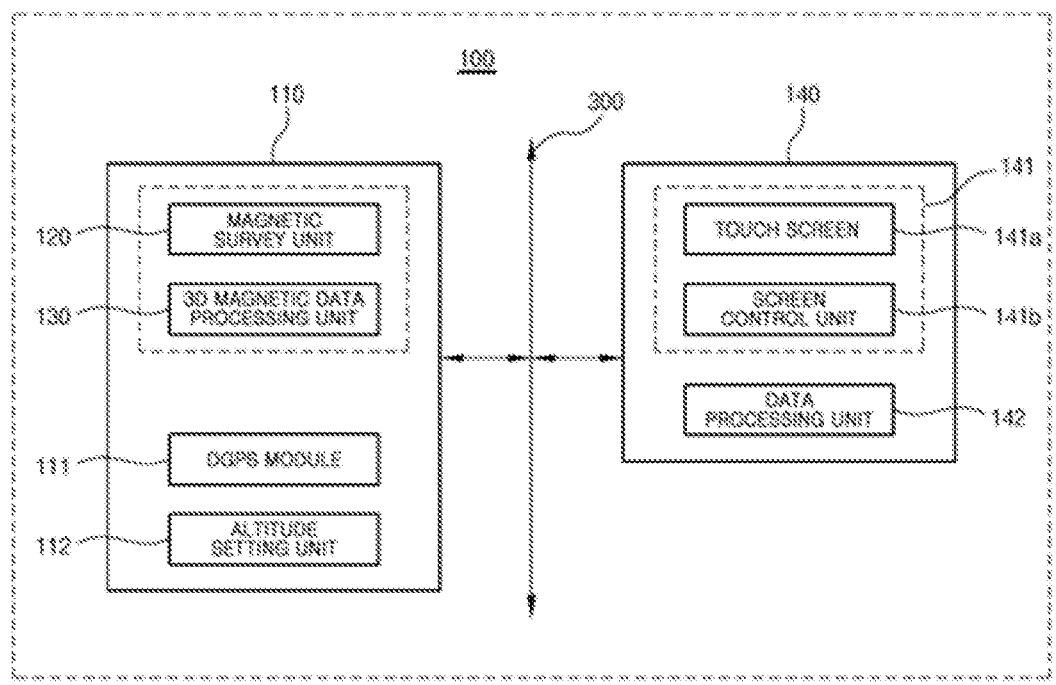
FIG. 3 is a block diagram illustrating a 3-dimensional (3D) airborne magnetic survey system according to an embodiment of the present disclosure according to an embodiment of the invention.

FIG. 3 is a block diagram illustrating a 3-dimensional airborne magnetic survey system according to an embodiment of the present disclosure.

Figure 4:
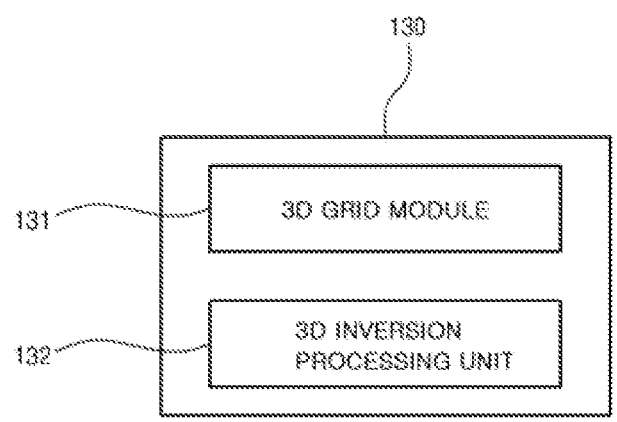
FIG. 4 is a detailed block diagram illustrating a 3D magnetic data processing unit illustrated in FIG. 3 according to an embodiment of the invention.

FIG. 4 is a detailed block diagram illustrating a 3D magnetic data processing unit illustrated in FIG. 3.

Figure 5:
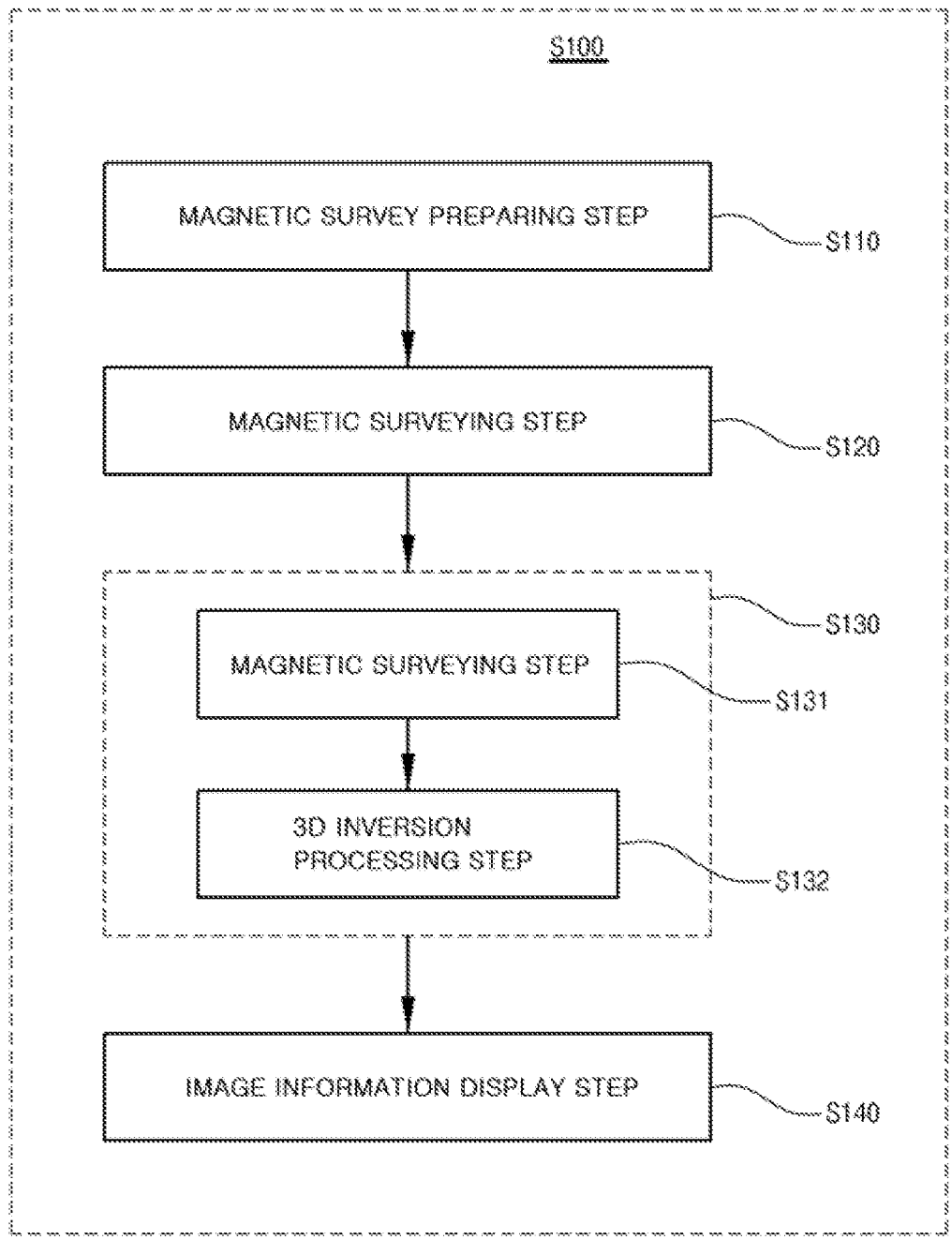
FIG. 5 is a flowchart for explaining a 3D airborne magnetic survey method according to an embodiment of the present disclosure according to an embodiment of the invention.

FIG. 5 is a flowchart for explaining a 3D airborne magnetic survey method according to an embodiment of the present disclosure.

FIG. 3 is a block diagram illustrating 3-dimensional airborne magnetic survey system according to an embodiment of the present disclosure.

As illustrated in FIG. 3, a 3D airborne magnetic survey system 100 according to an embodiment of the present disclosure may be a system for surveying magnetic fields of the earth or strata by making an altitude different for each survey point, which is desired to survey by using an unmanned aerial vehicle for magnetic survey, and then sequentially converting the surveyed magnetic field into 2-dimensional (2D) magnetic data and 3D magnetic data.

In detail, the 3D airborne survey system 100 includes an unmanned aerial vehicle for magnetic survey 100, a magnetic survey unit 120, a 3D magnetic data processing unit 130, and a wireless controller 140.

The unmanned aerial vehicle for magnetic survey 100 moves along coordinate areas of the earth or strata desired to survey through the wireless controller 140 and moves with altitude varied for each of the coordinate areas.

At this point, the unmanned aerial vehicle for magnetic survey 100 may include an electromagnetic wave shield agent (not shown) on the top surface facing the earth and survey a magnetic field of a target body (the earth or strata) without noise by shielding a magnetic signal generated externally.

In addition, unmanned aerial vehicle for magnetic survey 100 may include a differential global positioning system (DPGS) module 111 and an altitude setting unit 112, where the DGPS module 111 performs a function of searching coordinate areas of the earth or the strata, and the altitude setting unit 112 performs a function of varying an altitude for each coordinate area according to an altitude control signal output from the wireless controller 140.

The magnetic survey unit 120 is mounted on the unmanned aerial vehicle for magnetic survey 110 and performs a function of surveying 3D magnetic data of the earth or strata when the unmanned aerial vehicle for magnetic survey 110 moves at different altitudes.

For example, the magnetic surveying unit 121 surveys a magnetic field of the earth or strata and, in detail, performs a function of surveying a magnetic field of the earth or strata at surveying points A, B, C, . . . , A-1, B-2, and C-2 provided from the wireless controller 140.

The 3D magnetic data processing unit 130 performs 3-dimensional gridding on the 3D magnetic data of the earth or strata, which is surveyed according to an altitude change in a uniform interval, and then performs a 3D inversion processing.

In detail, the 3D magnetic data processing unit 130 includes a 3D grid module 131 and a 3D inversion processing unit 132.

The 3D lattice module 131 performs 3-dimensional gridding on the 3D magnetic data in a uniform interval along a survey direction, for example, performs gridding on the 3D magnetic data surveyed at the surveying points in a uniform interval along the survey direction (e.g., a moving path of the aerial vehicle).

The 3D inversion processing unit 132 performs a function of processing a 3D inversion for the 3D magnetic data gridded 3-dimensionally.

Next, the wireless controller 140 controls the unmanned aerial vehicle for magnetic survey 110 to move at altitudes through a navigation device and processes the 3D magnetic data provided from the 3D magnetic data processing unit in real time.

In addition, the wireless controller 140 may further include an image information display unit 141 displaying, to a user, the 3D magnetic data for each earth or stratum's coordinate of the surveying target.

The image information display unit 141 may include a touch screen 141*a* and a screen control unit 141*b*.

The touch screen 141*a* is a screen for sensing user's touches in a plurality of sensing schemes, and the screen control unit 141*b* performs a function of selecting one of touch signals sensed and generated in the plurality of sensing schemes on the basis of a type of an application being executed or a display state of the application, and allowing the application to be operated according to the selected touch signal.

Here, the plurality of sensing schemes may include at least two selected from resistive, capacitive, surface acoustic wave, infrared, optical imaging, and strain gauge schemes.

Figure 18:
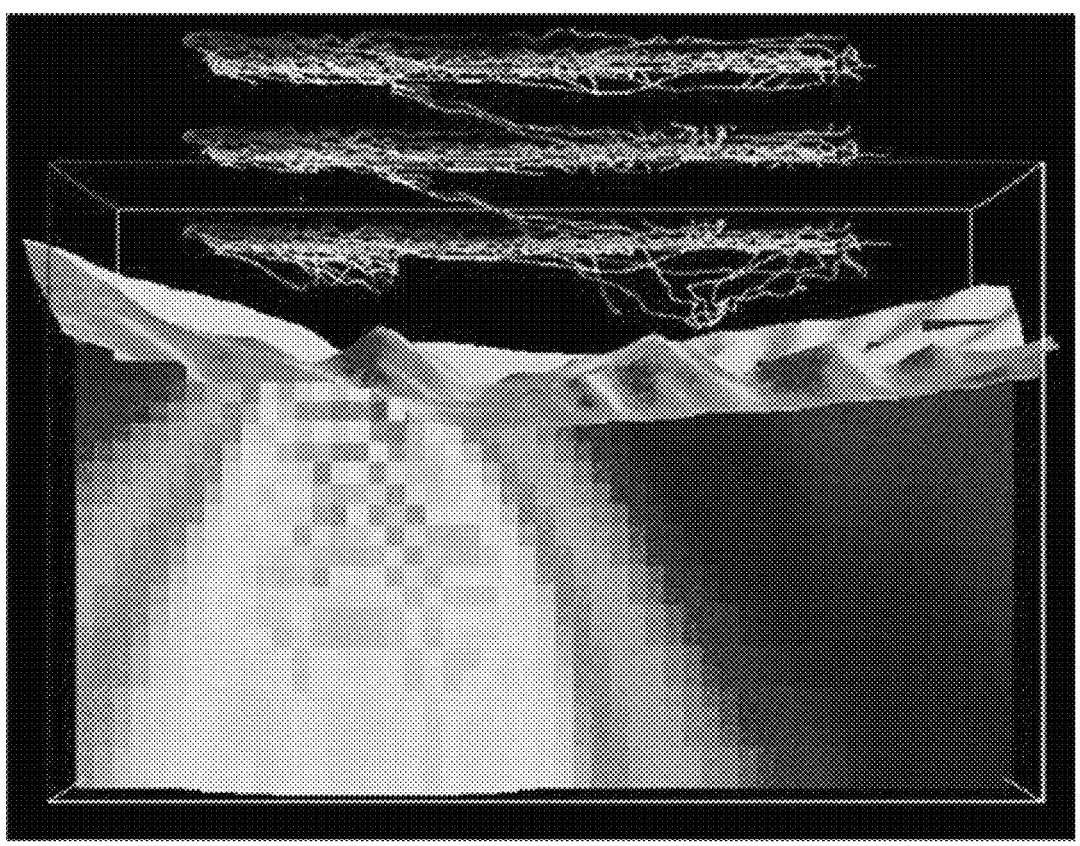
FIG. 18 is an exemplary view illustrating a cross-section of 3D magnetic image of strata, which is obtained through 3D airborne magnetic survey method using 3D airborne magnetic survey system according to an embodiment of the present disclosure.
Figure 19:
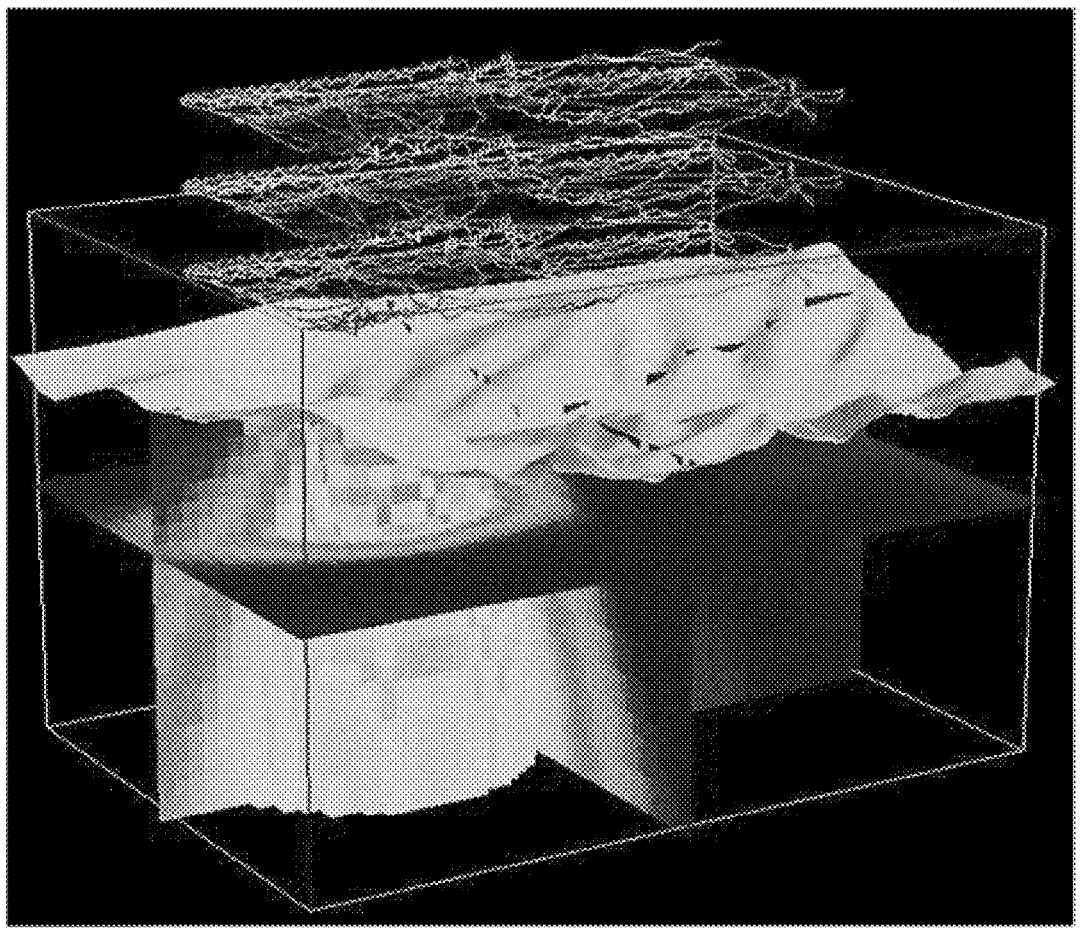
FIG. 19 is an exemplary view illustrating a stereoscopic image of FIG. 18 according to an embodiment of the invention.

Accordingly, the image information display unit 141 may display, to the user, the 3D magnetic data in a type illustrated I FIGS. 18 and 19.

Next, a very small aperture terminal (VSAT) interface 300 is a wireless communication network interacting with a satellite, and, in detail, may be a wireless communication network having a star-shaped network formed of a central hub station and a plurality of VSAT stations (child stations).

In addition, the VSAT interface 300 may be a wireless communication network in both TDM/TDMA and switched single channel per carrier (SCPC) schemes.

In detail, the VSAT interface 300 may be combined with various wireless communication networks such as a Wireless Wide Area Network (WWAN), a Wireless Local Area Network (WLAN), and a Wireless Personal Area Network (WPAN). The term "network" and "system" may be frequently used interchangeably. The WWAN includes a Code Division Multiple Access (CDMA) network, a Time Division Multiple Access TDMA) network, a Frequency Division Multiple Access (FDMA) network, an Orthogonal Frequency Division Multiple Access (OFDMA) network, Single-Carrier Frequency Division Multiple Access (SCFDMA) network, or a Long Term Evolution (LTE) network.

Here, the CDMA network may be run with one or more Radio Access Technologies (RATs) such as cdma2000 and Wideband-CDMA(W-CDMA). CDMA 2000 includes IS-95, IS-2000, and IS-856 standards. The TDMA network may be run with Global System for Mobile Communications (GSM), Digital Advanced Mobile Phone System (D-AMPS) or several other RATs.

GSM and W-CDMA are described in documents from a consortium named as 3rd Generation Partnership Project (3GPP). CDMA 2000 is described in documents from a consortium named as 3rd Generation Partnership Project2 (3GPP2).

3GPP and 3GPP2 documents are publicly available. WLAN is an IEEE 802.11x network, WPAN is a Bluetooth network, IEEE 802.15x, or any other type network. The techniques are also run by any combinations of WWAN, WLAN and/or WPAN.

Hereinafter, a 3-dimensional (3D) airborne magnetic survey system and a magnetic survey method using the same according to embodiments of the present disclosure will be described in detail with reference to the accompanying drawings.

FIG. 3 is a flowchart for explaining a 3D airborne magnetic survey method according to an embodiment of the present disclosure.

As illustrated in FIG. 3, the 3D airborne magnetic survey method S100 according to an embodiment of the present disclosure includes a magnetic survey preparing step (S110), a magnetic surveying step (S120), and a 3D magnetic data processing step (S130).

In addition, the 3D airborne magnetic surveying method (S100) may further include an image information displaying step (s140) for displaying the 3D magnetic data processed in the 3D magnetic data processing step (S130) on the image information display unit 141 for a coordinate of the surveying target earth or the surveying target stratum.

In detail, the magnetic surveying preparing step (S110) may be a step for setting, in the wireless controller, a coordinate area of the earth or strata desired to survey, a survey coordinate point of the coordinate area, an altitude of the unmanned aerial vehicle for magnetic survey moving in the air over the coordinate area.

The magnetic surveying step (S120) may be a step for surveying 3D magnetic data of the coordinate area of the earth or strata desired to survey for a fight altitude.

The 3D magnet data processing step (S130) may be a step for performing 3-dimensional gridding on the 3D magnetic data of the earth or strata surveyed according to an altitude change in a uniform interval according to a survey direction and then performing a 3D inversion processing.

In detail, the 3D magnetic data processing step (S130) includes a 3D gridding step (S131) and a 3D inversion processing step (S132).

The 3D gridding step (S131) is a step for performing 3-dimensional gridding on the 3D magnetic data in a uniform interval along the survey direction, for example, performing gridding on the 3D magnetic data surveyed at the surveying points in a uniform interval along the survey direction (e.g., a moving path of the aerial vehicle).

The 3D inversion processing step (S132) may be a step for processing a 3D inversion for the 3D magnetic data gridded 3-dimensionally.

Hereinafter, experimental examples are described which verify validity of the 2D survey and 3D survey methods through a model test.

Figure 6:
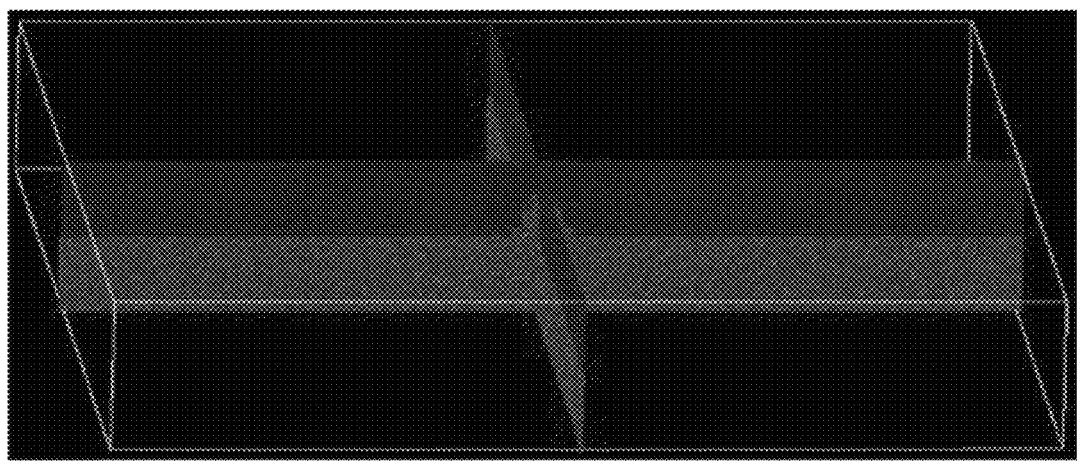
FIG. 6 is a cross-sectional view of a magnetic susceptibility structure of a model used for model verification according to an embodiment of the invention.
Figure 7:
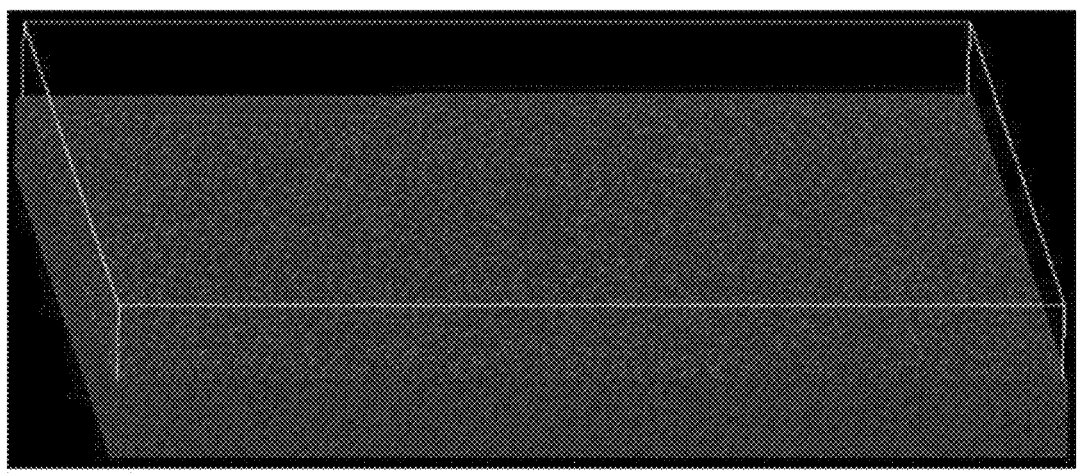
FIG. 7 is a 3D image of high magnetic susceptibility body among models used for the model verification according to an embodiment of the invention.
Figure 8:
FIG. 8 represents survey points created under assumption of 2-dimensional (2D) survey according to an embodiment of the invention.
Figure 9:
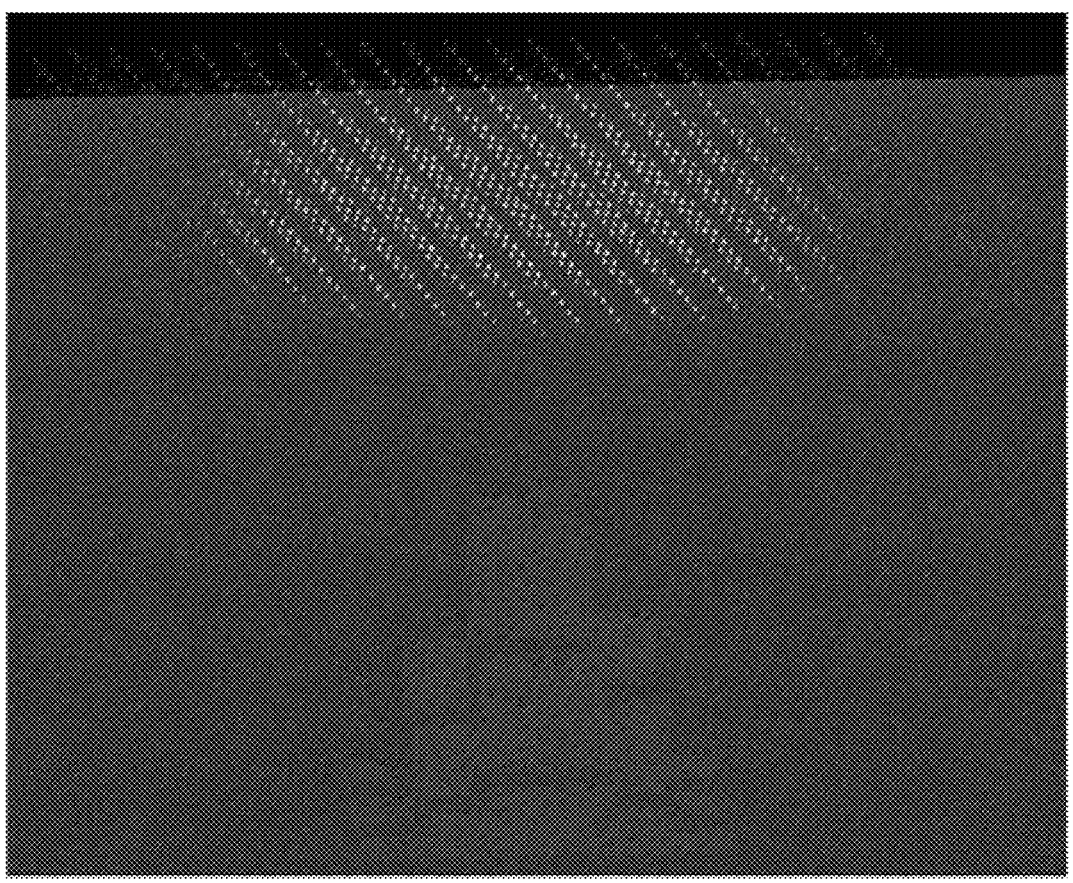
FIG. 9 represents survey points created under assumption of 3D survey according to an embodiment of the invention.
Figure 10:
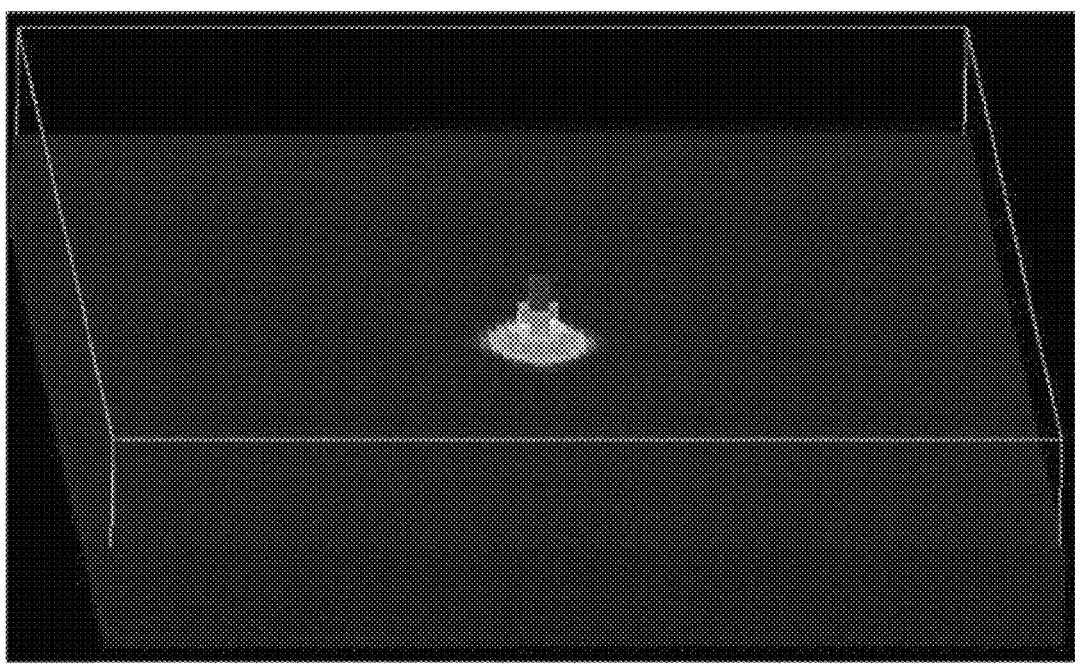
FIG. 10 represents a high magnetic susceptibility region among inversion processing results of 2D survey according to an embodiment of the invention.
Figure 11:
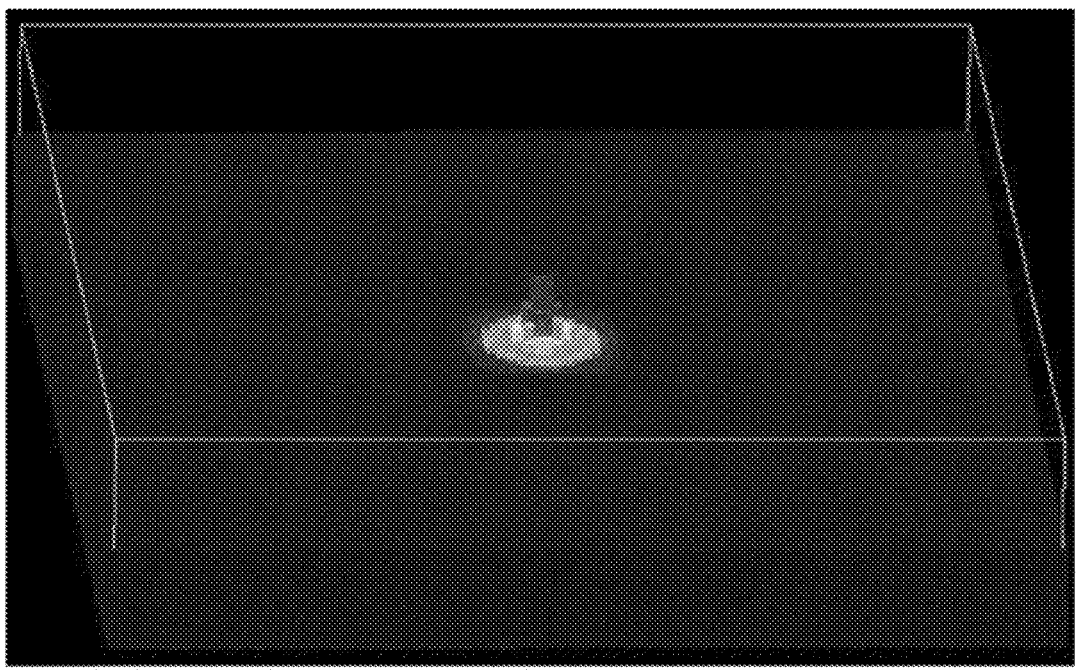
FIG. 11 represents a high magnetic susceptibility region among inversion processing results of 3D survey according to an embodiment of the invention.
Figure 12:
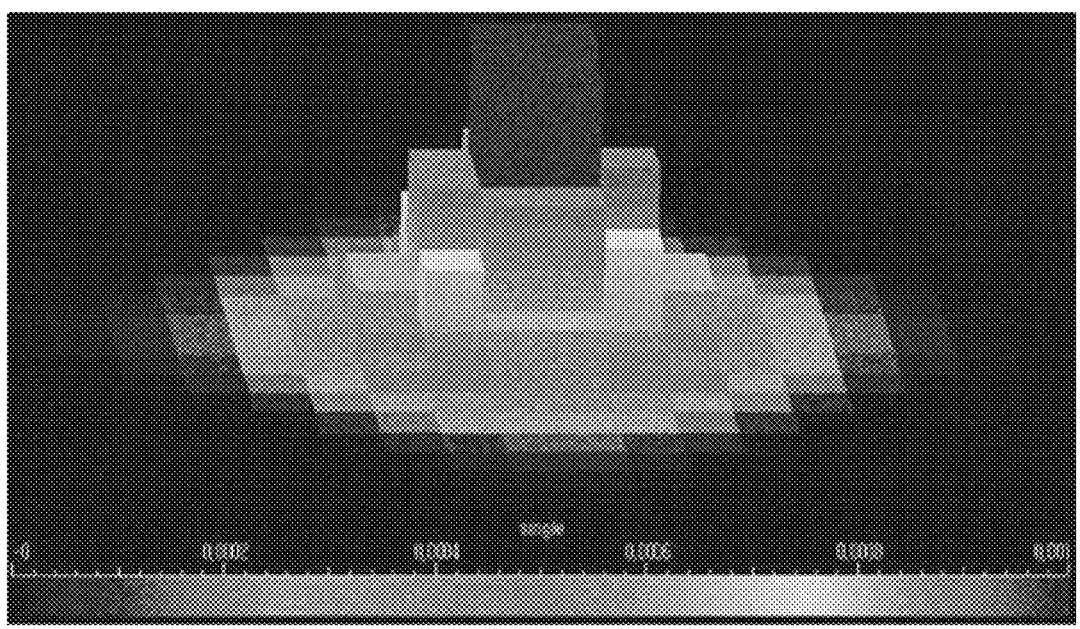
FIG. 12 represents an enlarged image of FIG. 10 according to an embodiment of the invention.
Figure 13:
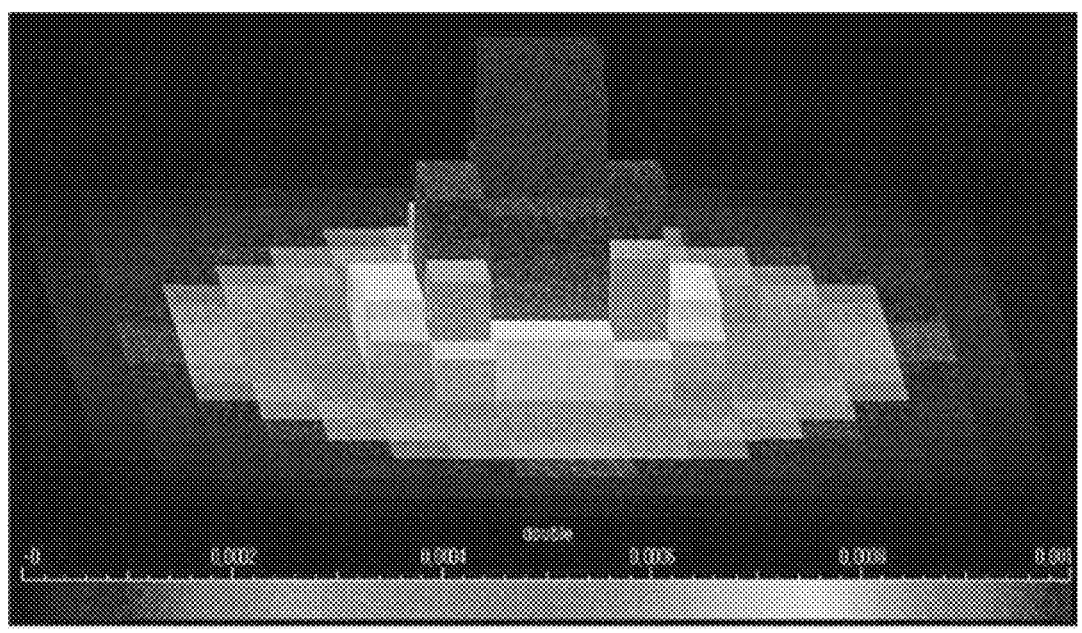
FIG. 13 represents an enlarged image of FIG. 11 according to an embodiment of the invention.
Figure 14:
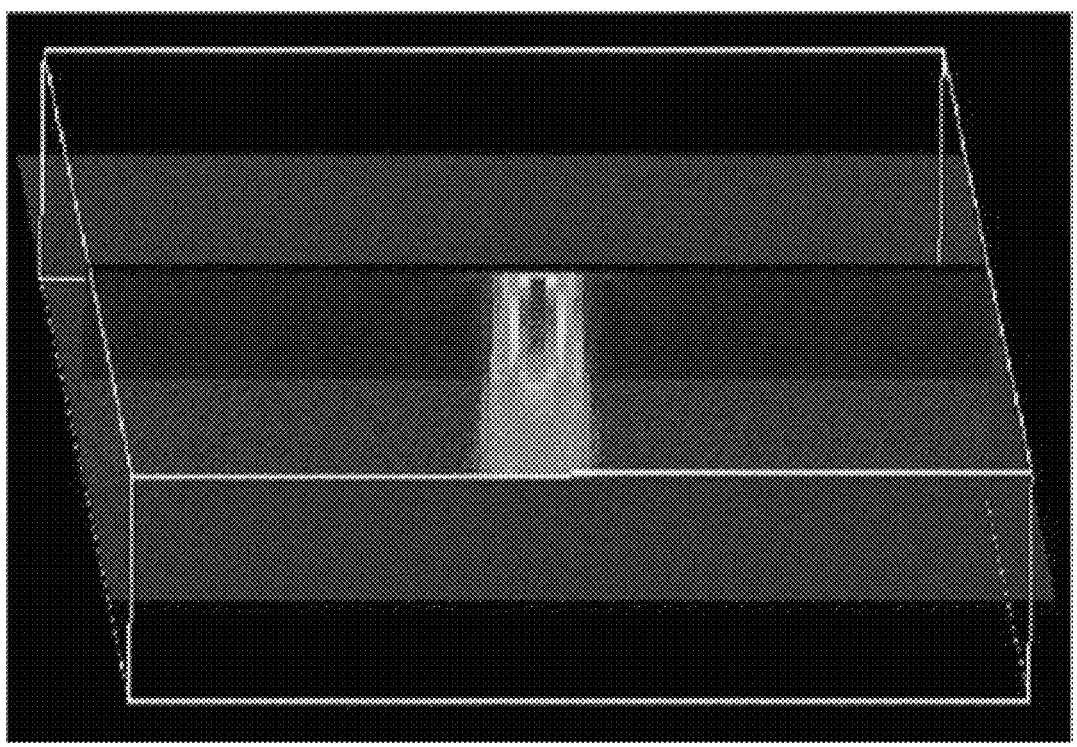
FIG. 14 represents a cross-section of inversion processing of 2D survey according to an embodiment of the invention.
Figure 15:
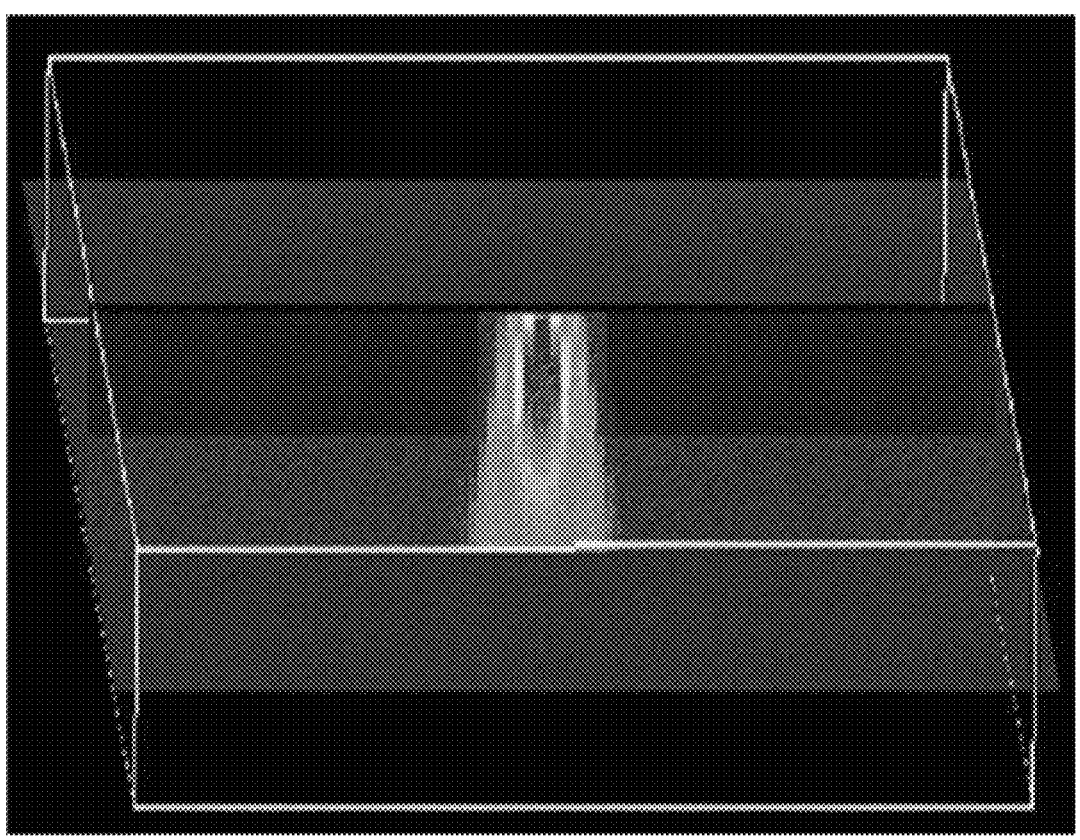
FIG. 15 represents a cross-section of inversion processing of 3D survey according to an embodiment of the invention.
Figure 16:
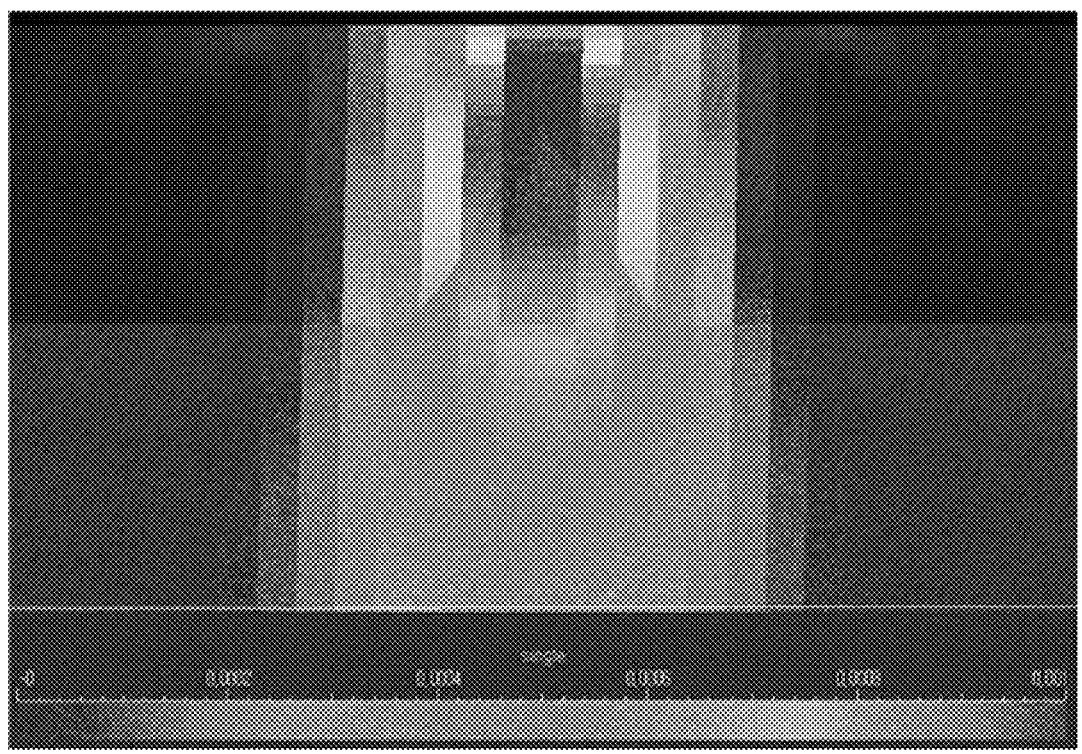
FIG. 16 represents an enlarged image of FIG. 14 according to an embodiment of the invention.
Figure 17:
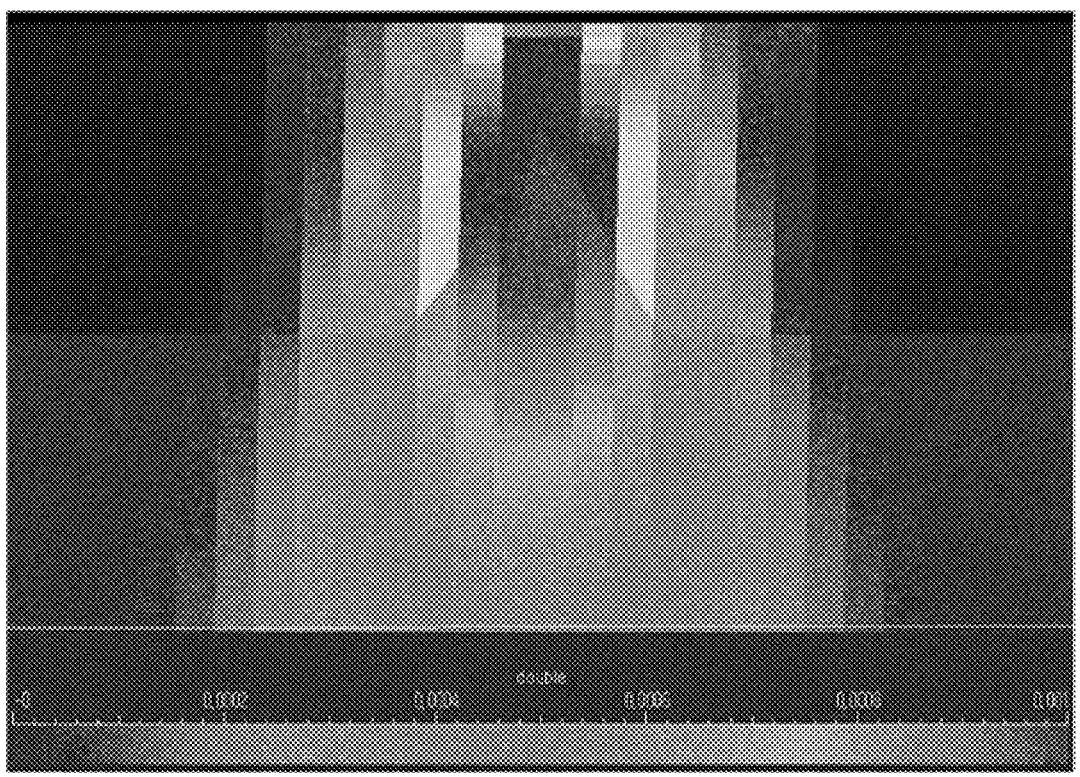
FIG. 17 represents an enlarged image of FIG. 15 according to an embodiment of the invention.

FIG. 6 is a cross-sectional view of a magnetic susceptibility structure of a model used or model verification. FIG. 7 is a 3D image of high magnetic susceptibility body among models used for the model verification. FIG. 8 represents survey points created under assumption of the 2D survey. FIG. 9 represents survey points created under assumption of the 3D survey. FIG. 10 represents a high magnetic susceptibility area among inversion results of the 2D survey. FIG. 11 represents a high magnetic susceptibility area among inversion results of the 3D survey. FIG. 12 represents an enlarged image of FIG. 10. FIG. 13 represents an enlarged image of FIG. 11. FIG. 14 represents a cross-section of inversion processing of the 2D survey. FIG. 15 represents a cross-section of inversion processing of the 3D survey. FIG. 16 represents an enlarged image of FIG. 14. FIG. 17 represents an enlarged image of FIG. 15.

TABLE 1

|  | details | 2D survey | 3D survey |
|---|---|---|---|
| model configuration | the number of surveying points | 2601 | 1764 (441x4) |
|  | distance | 50 m | 50/125/200/275 m |
|  | the number of inversion processing blocks | 450000 | 450000 |
| inversion processing error | inversion processing error (RMS misfit) | 0.0918527 nT | 0.146275 nT |
| result model error | error (std, deviation) | 0.00499489 | 0.00499308 |
|  | error (variance) | 2.49489 e-05 | 2.49308 e-05 |
|  | error (mean) | 0.00489263 | 0.00489145 |

Table 1 is a table representing a model configuration, inversion processing errors, and result model errors are classified into the 2D and 3D surveys.

In order to improve data reliability, the model verification in the present experiment was performed by using a Potential Fields module of GoCAD developed by Paradigm company, which is a commercial magnetic field analysis program.

In addition, the magnetic code used in the software is Vpmg code, which is globally famous and frequently used and cited by Science Citation Index (SCI) papers.

The model verification is to compare inversion processing efficiency between 3D survey data having various resolutions and 2D survey data. For the verification, an anomaly body of residual magnetization was not added to the model and the inversion processing was performed without adding noise to a forward operation code in consideration of characteristics of a magnetic survey method having limited resolution.

Such a method is possible because the magnetic inversion processing code itself includes a number of restrictions for having similar patterns as general geological structure, which is unlike to the forward operation code.

1. Model Description

A magnetic susceptibility model used for the verification is configured with flat topography having an altitude of 0 m and has two layered structure having 0.01 SI higher of magnetic susceptibility in the lower layer than in the higher layer from 1,000 m depth underground. However, a model was created by adding a shape that a high magnetic susceptibility body was intruded in a quadrangular pyramid type to a central part of the research area.

2. Creating Surveying Points Surveying points created for inversion processing of data were created under assumption that the survey is performed at an altitude of 50 m above the earth in a case of 2D survey, and at altitudes of 50/125/200/275 m above the earth in a case of 3D survey. The number of survey points was 2,601 for the 2D survey, and was 441 for each altitude, totally 1,764 for the 3D survey.

3. Survey Point Distribution Characteristics

Since resolution gets higher as a distance to a target body is shorter, survey points created at an altitude of 50 m having the shortest surveying point distance show stronger anomaly values compared to survey points created at other altitudes.

For the 2D survey, there are 2,601 survey points at the lowest altitude, which are more than 1,764 survey points distributed across 4 layers in the 3D survey. Therefore, it may be assumed that the 2D survey has much better data in terms of resolution and quantity of data in comparison to the 3D survey.

4. Result Analysis

Inversion processing error: The inversion processing error is a difference between a magnetic field at survey points used for the inversion processing and a magnetic field calculated with a reaction of a model that is interpreted by the inversion processing result. As for the model verification result, a case where the 2D survey data is used has a smaller inversion processing error in comparison to a case where the 3D survey data is used, but it is because high resolution data is used and it is not to be a basis determining how much the inversion processing result matches an actual model.

Result model error: A result model error is to represent a difference between values of a magnetic susceptibility model interpreted through the inversion processing and a magnetic susceptibility model used for creating actual survey points, and is a value showing how much the inversion processing matches an actual model.

As for the result mode error, since 3D survey results show smaller errors in standard deviation, variance, and mean than 2D survey results, the 3D survey results show more effective results in interpreting the actual model due to efficient spatial distribution, namely, 3D distribution, even though average resolution of data itself is lower than that of the 2D survey data Accordingly, the 3D aerial magnetic survey system 100 and a 3D magnetic survey method (S100) according to an embodiment of the present disclosure can improve quantity and quality of data and reduce an error in data interpretation by acquiring 3D data at the time of magnetic geological survey.

In addition, locations of anomaly zones can be precisely predicted since directivity of data is surveyed well by using 3D data Furthermore, since location variations of survey points are large in comparison to a typical method where an expensive variation rate sensor is used or several sensors are attached at various positions in order to obtain values of vertical magnetic variation rate, 3-dimensional data having high resolution values can be obtained.

In addition, when performing with typical methods, only one altitude planar data can be used for the inversion processing. Therefore a spatial distribution characteristic thereof is not efficient compared to 3D data at the time of inversion processing interpretation, and, when an anomaly body of residual magnetization is present, directivity thereof is difficult to predict. When 3D data for two or more layers is used, since there are two or more pieces of magnetic data at the same (x, y) coordinate, a spatial distribution of data used for the inversion processing becomes efficient in interpretation of the inversion processing and stability of the inversion processing becomes improved. Furthermore, when there is an anomaly body of residual magnetization is present in a research area, directivity prediction thereof is easier compared to the 2D survey.

On the other hand, the 3D airborne magnetic survey method (S100) proposed in an embodiment of the present disclosure is executed with a module (e.g., procedure, function, or the like) for executing functions described herein in execution including firmware and/or software.

A machine-readable medium having instructions recorded thereon is used for executing the methods described herein. For example, a software code is stored in a memory and executed by a processor unit.

The memory may be implemented inside or outside the processor unit. The term "memory" used herein represents a long term, short term, volatile, or nonvolatile memory, or another memory type, and does not limit any specific memory type, the number of memories, or a media type stored in a memory.

When executed with firmware and/or software, functions thereof are stored as one or more instructions or codes on a computer readable medium. Examples include a computer readable medium encoded with a data structure and a computer readable medium encoded with a computer program.

For example, a product includes a computer program product. The computer program product includes a computer readable medium. The computer readable medium includes a physical computer storage media. The storage media is an arbitrarily available media accessible by a computer.

Such a computer readable media includes, as an example, but is not limited to, a RAM, a ROM, an EEPROM, a CD-ROM, or another optical disc storage, a magnetic disk storage, a semiconductor storage, or other storage devices, or any other medium that can be accessed by a computer/processor (with a general purpose or particular purpose) and used for storing desired program codes in a command type or a data structure type.

Here, a disk and a disc include a compact disc (CD), a laser disc, an optical disc, a digital versatile disc, a floppy disk and a blu-ray disc, and typically disks magnetically play data while discs optically play data with lasers.

In addition, the aforementioned combinations should be included in a range of computer readable media.

In addition to be stored in a computer readable medium, commands and/or data are provided as signals of transmission media included in a communication device. For example, the communication device includes a transceiver having commands and signals indicating data.

The commands and data are implemented to execute function described in claims by one or more processors. In other words, the communication device includes transmission media having signals indicating data for performing implemented functions. At first, the transmission media included in the communication device may include a first portion of data for performing disclosed functions, and, secondly, may include a second portion of data for performing the disclosed functions.

According to the 3-dimensional airborne magnetic survey system, the magnetic survey method using the same, and a recording medium according to embodiments of the present disclosure, since a distribution characteristic of data used for inversion processing becomes good by acquiring 3-dimensional magnetic data at the time of magnetic survey, errors can be reduced in interpreting magnetic data according to a stratum structure.

In addition, locations of anomaly zones having different sizes according to the stratum structure can be precisely predicted using 3-dimensional magnetic data.

Furthermore, since position variations of survey points are large in comparison to a typical method that an expensive variation rate sensor is used or several sensors are attached at various positions in order to obtain values of vertical magnetic variation rate, 3-dimensional data having high resolution values can be obtained.

In other words, when there is only one altitude planar data (one data at an identical (x, y) coordinate), data resolutions are similar at the time of inversion interpretation and a distribution characteristic of the data is not good compared to 3-dimensional data. In addition, when there is an anomaly body of residual magnetization, directivity thereof is difficult to predict. According to the present disclosure, when 3-dimensional data of two or more layers is used, since two or more pieces of magnetic data are present at an identical (x, y) coordinate, resolutions of data used for the inversion processing are diversified, distribution of inversion processing data becomes efficient in interpreting the inversion processing, and stability of interpretation of the inversion processing becomes high.

Furthermore, when there is an anomaly body in a research area, directivity prediction thereof becomes easier compared to 2-dimensional survey.

Fields to which a 3D airborne magnetic survey system and a 3D airborne magnetic survey method according to an embodiment of the present disclosure are applied are various.

For example, since information on not only direct prospecting of iron deposit but also geological structure such as fault and shattered zone, and information on distribution of intrusive rock can be provided, the system and method can be widely used in fields of civil engineering including tunnel, dam, and large-scale structure construction and archeology as well as survey of useful resources including oil, geothermal heat, underground water, and the like.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A 3-dimensional airborne magnetic survey system comprising:
 an unmanned aerial vehicle to conduct a magnetic survey along coordinates of the earth or strata at various altitudes for each of the coordinates;

a magnetic survey unit mounted on the unmanned aerial vehicle to generate 3-dimensional magnetic data of the earth or strata at each of the various altitudes for each of the coordinates;

a 3-dimensional magnetic data processing unit to process an inversion on the 3-dimensional magnetic data of the earth or the strata according to the various altitudes by using 3-dimensional coordinates;

a very small aperture terminal (VSAT) interface; and a wireless controller that interacts with the VSAT interface, receives the 3-dimensional magnetic data, and outputs, to the unmanned aerial vehicle, a flight control signal for controlling the unmanned aerial vehicle at each altitude, a survey point coordinate signal, and a magnetic survey signal through an internal navigation program, wherein, the wireless controller comprises an image information display unit that displays to a user the 3-dimensional magnetic data for each coordinate of the magnetic survey.

2. The 3-dimensional airborne magnetic survey system of claim 1, wherein the unmanned aerial vehicle comprises:

a global positioning system (GPS) module; and an altitude setting unit to vary the altitude for each coordinate according to an altitude control signal output from the wireless controller.

3. The 3-dimensional airborne magnetic survey system of claim 1, wherein the 3-dimensional magnetic data processing unit comprises:

a 3-dimensional grid module that performs 3-dimensional gridding on the 3-dimensional magnetic data along a survey direction in a uniform interval; and a 3-dimensional inversion processing unit that processes an inversion on the 3-dimensional magnetic data gridded 3-dimensionally to interpret.

4. The 3-dimensional airborne magnetic survey system of claim 1, wherein the image information display unit comprises:

a touch screen that senses touches of the user in a plurality of sensing schemes; and a control unit that selects one of touch signals sensed and created respectively with the plurality of sensing schemes on the basis of a type of an application being executed or a display state of the application, wherein, the plurality of sensing schemes comprises at least two selected from the group consisting of resistive, capacitive, surface acoustic wave, infrared, optical imaging, and strain gauge schemes.

5. A 3-dimensional airborne magnetic survey method using the 3-dimensional airborne magnetic survey system according to claim 1, the method comprising:

a magnetic survey preparing step of setting, by the wireless controller, at least one coordinate area of the earth or strata desired to be surveyed, coordinates of survey points of each coordinate area, and various altitudes of the unmanned aerial vehicle for each coordinate;

a magnetic surveying step of surveying each coordinate area of the earth or strata for each altitude and generating 3-dimensional magnetic data of the earth or strata for each survey point in the coordinate area; and a 3-dimensional magnetic data processing step of performing 3-dimensional gridding on the 3-dimensional magnetic data of the earth or strata surveyed according to the various altitudes at each coordinate along a survey direction in a uniform interval, and processing the inversion 3-dimensionally.

6. The 3-dimensional airborne magnetic survey method of claim 5, wherein the 3-dimensional magnetic data processing step comprises:

a 3-dimensional gridding step of performing 3-dimensional gridding on the 3-dimensional magnetic data along the survey direction in the uniform interval; and a 3-dimensional inversion processing step of processing 3-dimensional inversion on the 3-dimensional magnetic data gridded 3-dimensionally.

7. The 3-dimensional airborne magnetic survey method of claim 5, further comprising an image information displaying step of displaying to the user the 3-dimensional magnetic data for each coordinate area through the image information display unit.

8. A non-transitory computer readable medium with a computer readable and executable program instructions thereon, which, when executed by a computer, cause the computer to effect a method, the method comprising:

a magnetic survey preparing step of setting, by a wireless controller, one or more coordinate areas of the earth or strata desired to be surveyed, coordinates of survey points of each coordinate area, and various altitudes of an unmanned aerial vehicle for each coordinate;

a magnetic surveying step of surveying each coordinate area of the earth or strata for at each altitude and generating 3-dimensional magnetic data of the earth or strata for each survey point in the coordinate area; and a 3-dimensional magnetic data processing step of performing 3-dimensional gridding on the 3-dimensional magnetic data of the earth or strata surveyed according to the various altitudes for each coordinate along a survey direction in a uniform interval, and processing the inversion 3-dimensionally.

* * * * *